(No Model.)
J. W. BARNES.
STATION INDICATOR.
No. 561,476. Patented June 2, 1896.
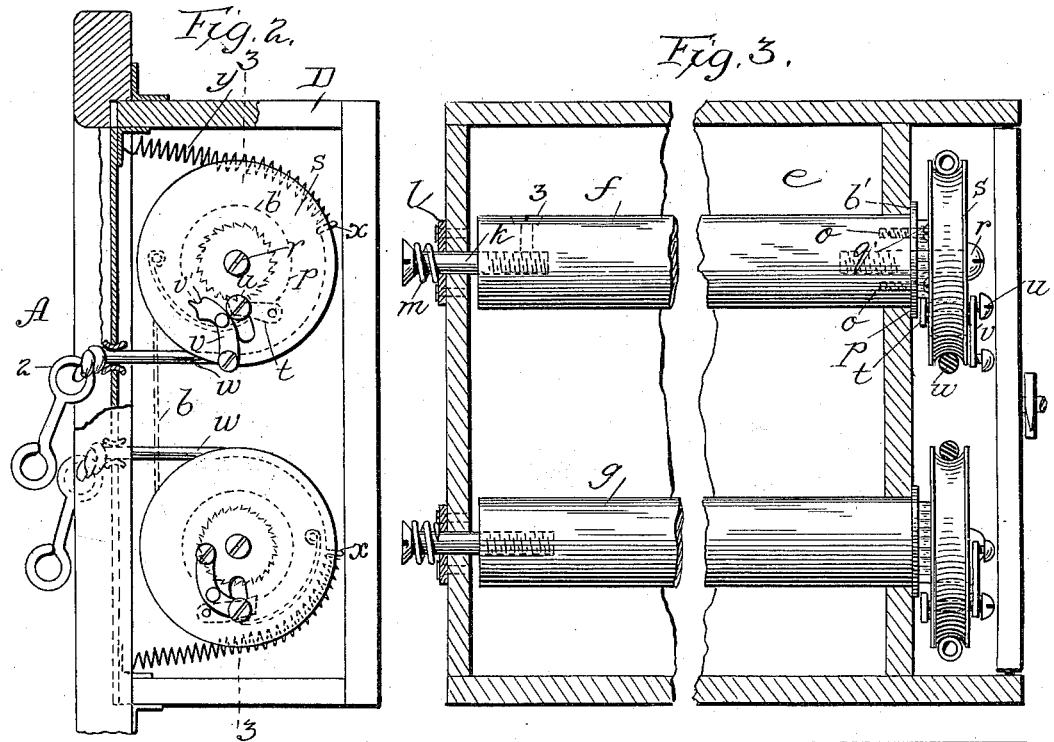
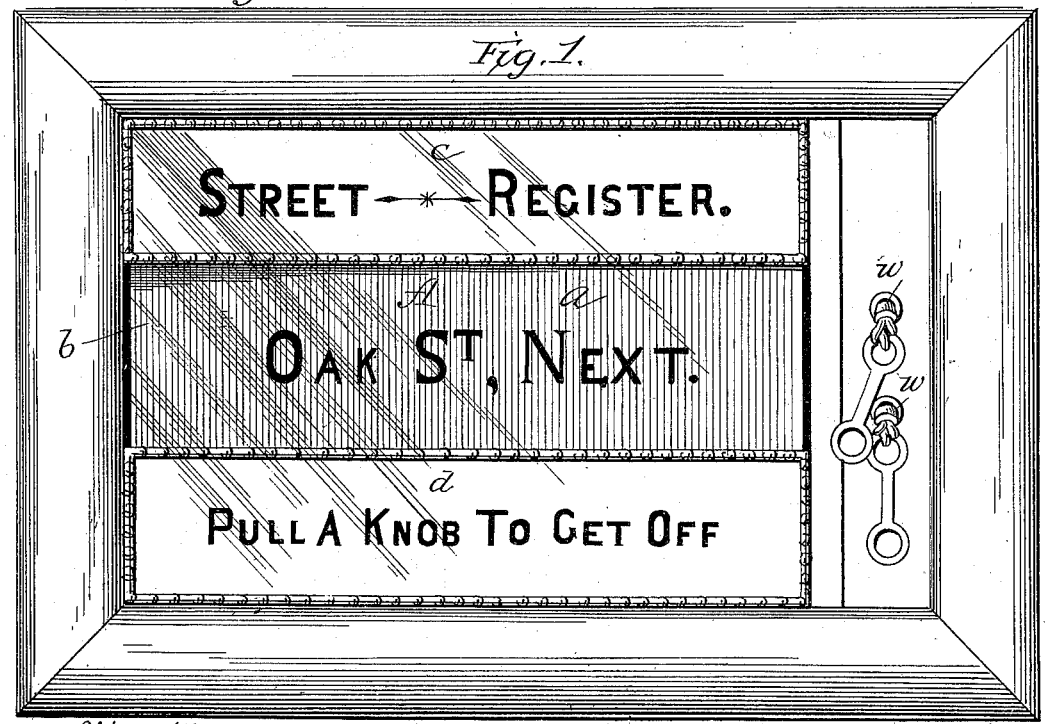

UNITED STATES PATENT OFFICE.

JOHN W. BARNES, OF ROCKLAND, MAINE.

STATION-INDICATOR.

SPECIFICATION forming part of Letters Patent No. 561,476, dated June 2, 1896.

Application filed December 21, 1895. Serial No. 572,900. (No model.)

*To all whom it may concern:*

Be it known that I, JOHN W. BARNES, a citizen of the United States, residing at Rockland, in the county of Knox and State of Maine, have invented certain new and useful Improvements in Car-Registers, of which the following is a specification, reference being had therein to the accompanying drawings.

My invention relates to street-car indicators of that class in which the names of the streets or stations or regular stopping-places of the car are indicated by the names of such streets or stations shown at an aperture and carried on a moving band.

The object of my invention is to provide, first, a simple and inexpensive register and one not liable to get out of repair or become inoperative when in use, and, further, I have sought to provide an indicator which will be quick and certain in its operation.

My invention, designed to accomplish these ends, consists in the details of construction hereinafter described, and illustrated in the accompanying drawings, in which—

Figure 1 represents a face view of the indicator. Fig. 2 is an end elevation with the end door removed and with parts broken away. Fig. 3 is a section on the line 3 3 of Fig. 2.

In the drawings, A represents the face of the indicator-box, and this may be of any ornamental appearance. Across the central part is an aperture $a$, through which the names on the band $b$ are visible. Above and below are spaces $c$ and $d$, in which any desired inscription or direction may be placed. The box D is of rectangular shape and has a main chamber $e$, in which the rollers $f$ and $g$ are located. These rollers are plain cylindrical rods, such as may be sawed from a cylindrical piece, and they are provided with bearings and held in place by screws in the ends. These screws also serve another purpose. On one end the screw $k$ passes through the wall of the box and through a metal disk $l$ on the outside and into the end of the roller and has a spring $m$ interposed between the disk and the head of the screw. On this end the roller, unreduced, may pass partly through the wall, in which it is thus made to bear and turn, or it may turn on the screw without entering the wall. The other end of the roller passes through a hole in the wall, and in its end are screws $o$ $o$, which fasten to the end of the roller a bearing-disk $p$, having a flange $b'$ larger than the hole and therefore bearing on the outside of the wall, so that as the spring at the other end pulls on the roller it pulls the plate $p$ and brings it into frictional contact with the wall and causes it to act as a brake. The same screws $o$ $o$ pass through the ratchet-wheel $q$ and hold it to the end of the roller. By this simple construction the rollers are journaled and a frictional brake is provided, which may be adjusted to any required degree by turning the screw. The bearing-disk $p$ and the ratchet-wheel $q$ have a central hole, through which passes a screw $r$ into the end of the roller and through a pulley $s$, which is thus mounted so as to turn freely. It has on the inside a spring-pawl $t$, adapted to engage with the ratchet-wheel and, when the wheel is turned, to cause the roller to turn also. A stud $u$, set in the pawl, projects through a slot in the pulley, so that by pushing on the head of the stud on the outside of the pulley the pawl may be moved out of connection with the ratchet-wheel. By the side of the stud is pivoted a dog $v$, having a curved face, arranged to press against the stud under its head and to force it back and lock the pawl out of connection, the locking being effected by means of a notch $v'$ in the dog.

It will be observed that both rollers are mounted in the same manner; but they turn in opposite directions, as one pulls the band in one direction and the other returns it when the car is going in the opposite direction.

While this apparatus may be operated in any manner—as, for example, by electrical connection and push-button—I have preferred to discard the complicated and expensive automatic mechanism and to leave the working of the apparatus to the conductor. For this purpose I provide in the groove of each pulley a cord or, preferably, a leather thong, (shown at $w$.) This lies in the groove of the pulley and is held by an eye $x$, so that by pulling the thong the pulley is turned. It is retracted by means of a spring $y$ for a fresh hold of the pawl, the spring being connected to the same eye.

The cords or thongs pass through bushed holes in the front and are connected to rings 2, to either of which, by means of a suitable snap-hook, the pulling-cord may be attached. The rings may be double and connected, as shown, one being attached to the cord and the other to receive the snap-hook. When the car is to run one way, the hook is connected to one ring, and when it runs in the opposite direction the hook is attached to the other ring.

The parts may be so arranged that a single pull will bring the next street or station name into sight; but whether one pull or more be necessary, it is pulled quickly and positively into place.

The pulleys are inclosed in a separate chamber having a side door, so that the pawl-studs are easily accessible for shifting.

The box may be provided with means for detachably securing it to the wall of the car, and one may be used and shifted from end to end, or two may be used, one in each end.

A set-screw 3, if found necessary, may be used to hold the journal-screw $k$ in place.

I claim—

1. In a car-indicator, and in combination, a pair of rollers, and a band thereon carrying the names of streets or stations, friction mechanism for the rollers, pulleys on the ends of the rollers having pawl-and-ratchet connections with the rollers, the pivoted dog adapted to disengage said pawl from said ratchet and lock said pawl in disengaged position, retracting-springs, and a pulling-cord attached to each pulley, arranged to be connected with the main pulling-cord, substantially as described.

2. In a car-indicator and in combination, the plain rollers, carrying the band, a screw passing through the wall into one end of the rollers, and having a spring on said screw, a frictional disk $p$, on the other end of said rollers, with a ratchet-wheel, fixed to the end of the rollers, a pulley arranged to run freely and having a pawl connecting it to the ratchet-wheel, means for holding the pawl out of engagement, and means for moving and retracting the pulley.

In testimony whereof I affix my signature in presence of two witnesses.

JOHN W. BARNES.

Witnesses:
 HENRY E. COOPER,
 F. L. MIDDLETON.